May 21, 1968  J. C. HODGE  3,384,428

THRUST WASHER ASSEMBLIES

Filed July 13, 1966

United States Patent Office 3,384,428
Patented May 21, 1968

---

3,384,428
THRUST WASHER ASSEMBLIES
John Charles Hodge, Princes Risborough, England, assignor to Railko Limited, Loudwater, High Wycombe, England, a British company
Filed July 13, 1966, Ser. No. 564,999
Claims priority, application Great Britain, July 19, 1965, 30,551/65
8 Claims. (Cl. 308—135)

ABSTRACT OF THE DISCLOSURE

A thrust bearing assembly, having two relatively rotatable thrust washers separated by a bearing element, is held together by an internal tubular sleeve fitting tightly within one thrust washer and loosely within the other. The sleeve is flanged outwardly into a recess in the free-running washer to hold the assembly together, and a resilient peripheral sealing band is provided to exclude dirt. An additional dirt-excluding seal is optionally provided between the flange of the tube and the recess of the free running washer.

---

Figure 1:
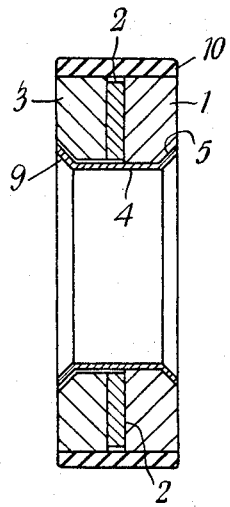

This invention relates to unitary thrust bearing assemblies and in particular to assemblies of the type in which two outer relatively moving members are separated by a low friction element in the form of a flat washer. The low friction element may be of metal, as for example a white-metal or bronze, in which case a lubricant will normally be required, or it may be of a non-metal, as for example nylon, polythene, polypropylene, polycarbonates, polyfluorocarbons or composites comprising such materials.

This invention is primarily, though not exclusively, concerned with thrust bearing assemblies where the relative movement between the outer members is slow or intermittent with changing direction of rotation. Examples of such applications are the king-pin thrust washers, used in the steering mechanisms of motor vehicles. In this type of application it is difficult to avoid excessive wear of the sliding faces due to the ingress of dirt and moisture.

It is well known to provide various forms of seal between the relatively moving parts of bearing assemblies, and this technique has been applied not only to ball and roller races, but also to plain bearings.

It is also known, as exemplified by U.S. Patent 3,300,230 to hold together a simple thrust bearing assembly of the kind which does not employ balls or rollers, by an external casing comprising two sheet metal cases which are interlocked so that they not only seal the bearing against entry of dirt but also hold it together as a unitary assembly.

It is the purpose of this invention to provide an efficient thrust bearing assembly, which comprises few component parts, is simple and relatively inexpensive to make and which is effectively sealed against the ingress of dirt and moisture or other foreign matter, so that wear rate is low and life expectancy is long.

According to the invention there is provided a thrust bearing assembly including two opposing annular thrust members, substantially cylindrical and of equal diameter, which are linked together in axial alignment so as to form a thrust bearing unit by means of a tubular sleeve which fits tightly into the bore of one of the thrust members but with running clearance into the bore of the other thrust member, retention of the two thrust members in close but free-running association being ensured by flanging the tubular sleeve outwardly into a complementary annular recess in the free-running thrust member; the inner faces of the thrust members being separated by a bearing element which may be loose, or integral with, or attached to one thrust member. The bearing element may also be retained in a shallow recess in one thrust member. That surface or surfaces of the bearing element which move relative to either or both of the thrust members is composed of any suitable low friction material, by which is meant any material known to exhibit low friction characteristics when sliding against the material of the opposing face of said thrust member. The gap between the relatively moving thrust members is sealed against the ingress of foreign bodies by means of a resilient ring, in tension, embracing the two thrust members. This resilient sealing ring may be in the form of a flat band, which may also have an inwardly extending medial flange of arrow-head cross-section which extends between the opposing faces of the two thrust members. Alternatively the sealing ring may have a substantially circular cross-section and be stretched to lie in a groove formed by bevelling the inward facing peripheries of the two thrust members.

The sleeve, which links together the two annular thrust members, may be additionally secured to the bore of the thrust member within which it is a close fit, by being flanged outwardly at its end into a complementary recess in the bore of that thrust member.

When service conditions make it necessary to prevent the ingress of foreign bodies into the clearance space between the sleeve and the free-running thrust member, an annular gap is provided between the outwardly extending flange on the sleeve and the free-running thrust member, and a resilient ring of circular cross-section is sprung into the gap between that flange and the recess, so as to provide a seal.

One embodiment of a thrust bearing assembly according to our invention comprises thrust members in the form of flat cylindrical washers each having a central hole and carrying, between them, a bearing element constituted by a washer of low friction material which is less in diameter than the thrust members. The inner face of one thrust member is of a material and finish suitable for low-wear sliding against the opposing surface of the low friction washer, which latter may or may not be secured to the inner face of the other thrust member. Through the central holes in the thrust members, and clearing the central hole in the low friction washer a tube is provided which is a tight, sealing and retaining fit in one thrust member but which can move, with close running clearance, within the second thrust member. To maintain the assembly as a single unit the inner tube is flanged outwardly, with running clearance, into a mating bevel in the member within which it is free to move. Optionally additional sealing between the inner tube and the member within which it is free to move may be provided by springing a flexible O-ring into a V channel formed between the flange on the tube and a mating recess in the thrust member.

Ingress of moisture or foreign matter from the periphery into the gap between the two thrust members is prevented by a rubber or like flexible ring seal in tension which may be a flat ring embracing both thrust members or an O-ring lying in an annular recess formed by bevelling the inward facing peripheries of the thrust members. When a flat sealing ring is used this may be of the type known as a "crows-foot" sealing band which has an inwardly directed medial flange of arrowhead cross section to provide an effective lateral seal.

The resilient sealing rings may be of natural or synthetic rubber or like elastomers, and are preferably oil-resistant. The surface of the ring which is called upon to slide relatively to a thrust member may with advantage be coated with a flexible varnish containing polytetrafluoroethylene.

In putting the invention into effect we may make the thrust members of any material possessing the desired structural properties and such that the inner face of one of them is, or can be made, suitable for sliding with low wear against the low friction material. Thus we may use cast iron, or mild steel preferably with one face of one member case hardened. Or we may use brass or bronze or such composites as resin-impregnated fabrics.

The low friction washer may be of a conventional bearing metal, as, for example, of white-metal or a lead bronze alloy, in which case a lubricant must be employed either impregnated or sealed into an appropriate cavity.

We prefer, however, to employ one of the many known non-metallic materials for the low friction washer, for example nylon, polythene, polypropylene, polycarbonates, polyfluorocarbons or composites, including such materials as for example resin-impregnated fabrics which comprise polytetrafluoroethylene in their bearing face. We do not limit ourselves in any way to the material used for the low friction washer because this factor is quite distinct from the ambit of this invention, which is concerned with the means for excluding moisture and foreign matter from the sliding faces.

The low-friction washer need not be secured to one thrust member; it may float in such manner as to slide against both thrust members. It need not necessarily be made as a separate component but can be formed in situ as one stage in making one of the thrust members.

So that the invention may be clearly understood and readily carried into effect, it will now be described with reference to the accompanying cross-sectional diagrammatic drawings which illustrate five embodiments by way of example only. In these drawings the same figures refer to the same features.

FIGURE 1 shows the invention in its simplest form. 1 and 3 are the two thrust members and 2 is the interposed low friction washer which moves with member 1 and slides against the inner face of member 3. The inner tube 4 is a tight fit in member 1 and is held firmly in place by being flanged at 5. The inner tube is a close running fit in member 3 and is retained, without hindering freedom to rotate, by being flanged at 9. The oil-resistant rubber band 10 is sprung around the peripheries of members 1 and 3 to provide an effective seal.

Figure 2:
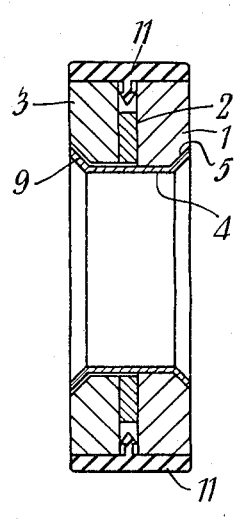

The embodiment shown in FIGURE 2 differs from that of FIGURE 1 only in having a "crows-foot" type of sealing band, 11.

Figure 3:
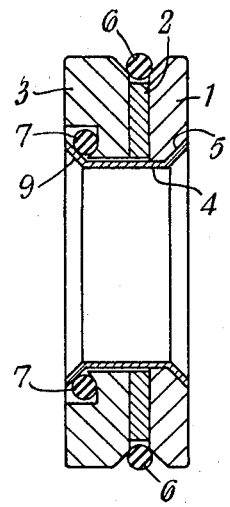

FIGURE 3 shows a modification in which sealing is effected by two elastomer O-rings, both in tension. O-ring 6 lies in the groove formed by bevelling the inner peripheral edges of members 1 and 3; O-ring 7 lies between the flange 9 and the lip of a recess in member 3, maintaining tight sealing between the members 1 and 3 even after substantial wear of the low friction washer has caused substantial relative axial displacement of the two members 1 and 3.

Figure 4:
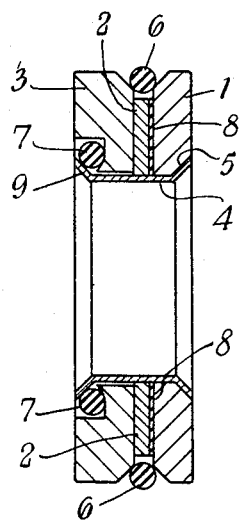

In the modification shown in FIGURE 4 a washer 8 of rubber or like material is disposed between the low friction washer and member 1 with which it moves.

Figure 5:
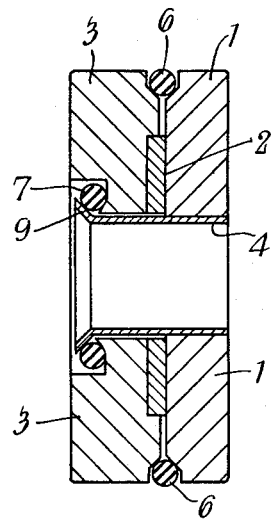

The embodiment shown in FIGURE 5 is similar to that of FIGURE 3 but differs in omitting the flange 5; the tube 4 being made so as to be a drive fit in member 1. In this embodiment the tube 4 does not require flanging after the parts have been assembled.

The embodiments above described are by way of example only and are not intended to limit the invention, which is capable of other realizations within the scope of the appended claims. In particular the various individual features of the several examples may be permuted and/or combined within the scope of said claims. To give one example, the general structure of FIG. 5 could be modified by the adoption of the flat peripheral sealing band of FIG. 1 in place of the O-ring 6.

I claim:
1. A thrust bearing assembly which comprises
two substantially cylindrical annular thrust members of equal diameter,
the opposing inner faces of said thrust members being separated by an annular, flat, washer-like bearing element mounted in said assembly to rotate about the longitudinal axis thereof at least relative to one of said thrust members;
at least that surface of said bearing element which opposes and moves relative to such thrust member being of low-friction material;
said thrust members being retained in axial alignment and in close but free-running association with one another by a tubular sleeve,
said sleeve having an interference fit in the bore of one of said thrust members and having clearance in the bore of the other said member which is free-running thereon;
the outer end of said sleeve which passes with clearance through said other free-running thrust member being flanged radially outwardly to enter, but with clearance, a relieved portion of the outermost part of the bore of said other free-running thrust member to an extent which holds said assembly together against separation in an axial direction; and
an external peripheral resilient band, in tension, embracing said assembly and sealing the gap between said thrust members in a radial plane against the inward entry of foreign bodies.

2. A thrust bearing assembly according to claim 1, in which an annular clearance space is defined between said flange of said tubular sleeve and said relieved portion of said other free-running thrust member, and the gap constituted by the clearance between the outer face of said sleeve and the bore of said other free-running thrust member is sealed against the inward entry of foreign bodies by a resilient sealing ring of substantially circular cross-section carried in said annular clearance space.

3. A thrust bearing assembly according to claim 1, in which said bearing element is fixed to one of said thrust members.

4. A thrust bearing assembly according to claim 1, in which said bearing element is rotatable relative to both said thrust members and to said sleeve, and both surfaces of said bearing element which respectively oppose and move relative to said thrust members are of low-friction material.

5. A thrust bearing assembly according to claim 1, in which said bearing element is carried in an annular recess in one of said thrust members, said recess measuring less in depth than the thickness of said bearing element.

6. A thrust bearing assembly according to claim 1, in which said bearing element does not extend radially outwardly as far as the periphery of said thrust members, and said resilient band is provided with a radially inwardly extending flange of arrow-head cross-section which extends between the opposing inner faces of said two thrust members.

7. A thrust bearing assembly according to claim 1, in which said resilient band is of substantially circular cross-section and lies in a groove at least partly formed by bevelling the opposing peripheries of said two thrust members.

8. A thrust bearing assembly according to claim 1, in which said sleeve is additionally secured to said one thrust member within which it fits tightly by being flanged outwardly at its end into a complementary relieved portion of the outermost part of the bore of said tightly fitting thrust member.

References Cited

UNITED STATES PATENTS

| | | | |
|---|---|---|---|
| 2,617,668 | 11/1952 | Stewart | 277—95 |
| 3,140,129 | 7/1964 | Koss | 308—187.2 |
| 3,300,230 | 1/1967 | Spencer | 308—187.2 |

FOREIGN PATENTS

| | | |
|---|---|---|
| 456,862 | 11/1936 | Great Britain. |
| 569,065 | 4/1924 | France. |
| 825,364 | 12/1959 | Great Britain. |

MARTIN P. SCHWADRON, *Primary Examiner.*

FRANK SUSKO, *Examiner.*